US010594989B2

(12) United States Patent
Herrmann et al.

(10) Patent No.: US 10,594,989 B2
(45) Date of Patent: Mar. 17, 2020

(54) SAFETY MIRROR WITH TELESCOPING HEAD AND MOTOR VEHICLE (71) Applicant: SMR Patent S.à.r.l., Luxembourg (LU)

(72) Inventors: Andreas Herrmann, Stuttgart (DE); Paul Henion, Troy, MI (US); Darryl Brooks, Troy, MI (US); Philipp Hottmann, Stuttgart (DE); Gary Sinelli, Troy, MI (US)

(73) Assignee: SMR Patent S.à.r.l., Luxembourg (LU)

( * ) Notice: Subject to any disclaimer, the term of this patent is extended or adjusted under 35 U.S.C. 154(b) by 0 days.

(21) Appl. No.: 16/444,625

(22) Filed: Jun. 18, 2019

(65) Prior Publication Data

US 2019/0306466 A1 Oct. 3, 2019

Related U.S. Application Data (63) Continuation-in-part of application No. 15/902,149, filed on Feb. 22, 2018, now Pat. No. 10,343,609, and (Continued)

(30) Foreign Application Priority Data

Feb. 22, 2017 (DE) .................. 10 2017 103 669

(51) Int. Cl.
B60R 1/00 (2006.01)
H04N 7/18 (2006.01)

(52) U.S. Cl.
CPC .............. H04N 7/183 (2013.01); B60R 1/00 (2013.01); B60R 1/006 (2013.01);
(Continued)

(58) Field of Classification Search
CPC ... B60R 1/12; B60R 11/04; B60R 2011/0035; B60R 2001/1253; B60J 3/00; B60J 3/0204; H04N 7/18
(Continued)

(56) References Cited

U.S. PATENT DOCUMENTS 6,511,189 B1 1/2003 Henion et al.
6,812,831 B2 11/2004 Ikeda
(Continued)

FOREIGN PATENT DOCUMENTS

CN 204222742 U 3/2015
DE 100443099 A1 3/2002
(Continued)

OTHER PUBLICATIONS

Chinese Office Action dated Jan. 24, 2019 of Chinese application No. 201810153858X.
(Continued)

Primary Examiner — Pinel E Romain
(74) Attorney, Agent, or Firm — Jones Day (57) ABSTRACT A safety mirror system for a motor vehicle includes at least one sun visor including a safety mirror having a mirror element in a folded down position, and at least one camera or monitoring system including a support arm pivotally secured to a base, the support arm pivotal between retracted and extended positions, a positioning arm secured to the support arm and movable with respect to the support arm and including a camera mount, and at least one camera attached to the camera mount at a distal end of the positioning arm, the camera configured to provide images exterior to the vehicle, wherein the safety mirror further includes at least one attachment structure configured to separately and selectively attach the safety mirror to each of the sun visor and the camera mount.

21 Claims, 5 Drawing Sheets

Related U.S. Application Data a continuation-in-part of application No. 15/621,306, filed on Jun. 13, 2017, which is a continuation-in-part of application No. 14/830,406, filed on Aug. 19, 2015, and a continuation-in-part of application No. 14/013,378, filed on Aug. 29, 2013, now Pat. No. 9,815,410, which is a continuation of application No. 13/234,824, filed on Sep. 16, 2011, now abandoned.

(60) Provisional application No. 61/694,293, filed on Aug. 29, 2012.

(52) U.S. Cl.
CPC ... *B60R 2300/105* (2013.01); *B60R 2300/408* (2013.01); *B60R 2300/607* (2013.01); *B60R 2300/802* (2013.01); *B60R 2300/8046* (2013.01)

(58) Field of Classification Search
USPC .............................................. 296/97.1, 97.5
See application file for complete search history.

(56) References Cited

U.S. PATENT DOCUMENTS

| | | |
|---|---|---|
| 6,947,071 B2 | 9/2005 | Eichmann |
| 7,630,803 B2 | 12/2009 | Stam et al. |
| 7,748,857 B2 | 7/2010 | Fimeri et al. |
| 8,366,318 B2 | 2/2013 | Zeller et al. |
| 8,947,071 B2 | 2/2015 | Rudkin et al. |
| 9,403,491 B2 | 8/2016 | Happy et al. |
| 9,712,741 B2 * | 7/2017 | Kothari ............... B60R 11/0235 |
| 2003/0103142 A1 | 6/2003 | Hitomi et al. |
| 2004/0230358 A1 | 11/2004 | Stam et al. |
| 2005/0200988 A1 | 9/2005 | Olijnyk et al. |
| 2006/0187304 A1 | 8/2006 | Sakata |
| 2007/0127564 A1 | 6/2007 | Li |
| 2007/0263090 A1 | 11/2007 | Abe |
| 2008/0055411 A1 | 3/2008 | Lee |
| 2008/0089557 A1 | 4/2008 | Iwaki et al. |
| 2008/0116943 A1 | 5/2008 | Nair |
| 2010/0039494 A1 | 2/2010 | Horihata et al. |
| 2010/0079267 A1 | 4/2010 | Lin |
| 2010/0259371 A1 | 10/2010 | Wu et al. |
| 2011/0317049 A1 | 12/2011 | Kurane et al. |
| 2012/0062743 A1 | 3/2012 | Lynam et al. |
| 2014/0063245 A1 | 3/2014 | Bowers et al. |
| 2018/0131908 A1 * | 5/2018 | Salter ..................... G06F 3/044 |

FOREIGN PATENT DOCUMENTS

| | | |
|---|---|---|
| DE | 59618192 T2 | 7/2002 |
| DE | 59709810 T2 | 9/2002 |
| EP | 2457770 B1 | 1/2014 |
| WO | WO 2006/018951 A1 | 2/2006 |

OTHER PUBLICATIONS

European Search Report for application No. EP 10 17 8378 dated Nov. 2, 2011; 5 pp.

German Office Action dated Oct. 12, 2017 of DE 102017103669.5.

\* cited by examiner

SAFETY MIRROR WITH TELESCOPING HEAD AND MOTOR VEHICLE

CROSS-REFERENCE TO RELATED APPLICATION

This application is a continuation-in-part of U.S. patent application Ser. No. 15/902,149, filed Feb. 22, 2018, which claims the benefit of foreign priority to German Patent Application No. DE 10 2017 103 669.5, filed Feb. 22, 2017, and this application is also a continuation-in-part of U.S. patent application Ser. No. 15/621,306, filed Jun. 13, 2017, which is a continuation-in-part of U.S. patent application Ser. No. 14/830,406, filed Aug. 19, 2015, which is a continuation of U.S. patent application Ser. No. 13/234,824, filed Sep. 16, 2011, and is also a continuation-in-part of U.S. patent application Ser. No. 14/013,378, filed Aug. 29, 2013, which claims the benefit of priority to U.S. Provisional Patent Application No. 61/694,293, filed Aug. 29, 2012, each of which is incorporated herein by reference in its entirety for all purposes.

BACKGROUND OF THE INVENTION

1. Field of the Invention

The following description relates to a safety mirror for a motor vehicle. A safety mirror may be used with least one sun visor including a mirror element in a folded-down state which is viewable by a driver or passenger of the motor vehicle, at least one rearview assembly or camera/monitoring system for taking pictures of an area behind and next to the motor vehicle, and at least one camera mount for attaching the camera to the motor vehicle. The rearview assembly or camera/monitoring system may include a pivotable camera or a pivotable safety mirror which may pivot to variable orientations depending on whether a positioning arm is telescoped outwardly in an extended position, retracted inwardly to a retracted position or folded into a folded position.

2. Related Art

Certain vehicles are equipped with structures such as tow bars and the like to tow trailers, campers, boats, mobile homes, etc. Sometimes the towed vehicles are so wide that typical side view mirrors do not extend far enough from the vehicle to allow the vehicle operator to see around the towed vehicle. Accordingly, it is known to equip the towing vehicle with side view mirrors that can extend, in a telescoping manner, from a retracted position that is relatively close to the vehicle to an extended position sufficient to allow the vehicle operator to adequately see around the towed vehicle.

In certain embodiments, the towing vehicle can be equipped with cameras designed to enhance the view of the vehicle operator of hard-to-see areas around the periphery of the vehicle. In some embodiments, the cameras can be incorporated into the side view mirrors and configured to provide views of the sides of the vehicles.

Movable camera systems are typically known to be used as a replacement for exterior rearview mirrors in motor vehicles.

U.S. Pat. No. 9,403,491 describes a vehicle having a vehicle body structure which has an outer side and an inner side facing the passenger compartment. A base element fixed on the outside and a video camera movable on the base element for a linear movement between a retracted position and an extended position to recording a video image is mounted from an area outside the vehicle body structure. In addition, a video display is supported on the vehicle body structure so that the video display is visible in the passenger compartment. An image processor is operatively coupled to the video camera and video display to process the video image captured by the video camera and to stream a video to the video display.

Sun visors for motor vehicles are also known in the art. Typically, when folded down, sun visors not only present a makeup mirror but also a display for displaying a television, video images and/or moving graphics, as described by German Patent Application No. DE 197 39 352 A1. The display and makeup mirror are arranged at the folded down sun visor on the visible side of the occupant of the sun visor. The display may be protected by a removable, sliding, or fold-away cover which may be a mirror.

U.S. Pat. No. 6,947,071 B2 describes a vehicle interior monitoring system having a portable display that can be removably positioned in the interior of a vehicle, the display being attachable to and removable from a surface of the interior without altering the surface. Such surfaces include those of sun visors or rearview mirrors in the passenger compartment.

European Patent No. 2 457 770 B1 describes a plastic mirror mounting system for a rearview mirror on a vehicle. The rearview mirror includes a substrate made of plastic material which is coated on a first surface with at least one reflective layer and has on its second surface means for connection to a mounting structure. The plastic substrate includes at least three plastic mirror clips. Each plastic mirror clip has at least one shoulder which increases the contact area between the plastic mirror clip and the second surface, an enlargement, which has a distance from the second surface, and an internal inclination at the end of the enlargement. The mounting structure includes mounting structure clips with rigid arms and spatially confined flexible arms. Each mounting structure clip has a stepped structure forming a step-shaped fastener complementary to the enlargement of a plastic mirror clip while the flexible arms contact the enlargement and inclination of the plastic mirror clips so that the end faces of the flexible arms and the slope secure the connection. The mounting structure may be at least part of a counter plate or part of a cover plate of a motor drive or part of a one-piece mirror housing.

A reflective coating for a polymer substrate is described by European Patent Application No. EP 2 807 284 A1 where a coating has a thickness of 200 nm or less and uses an alloy of chromium and a doping material.

While with camera images, a driver obtains an even better impression of the rearward traffic conditions, in principle there is also the danger that the camera system fails and thus there is a security risk which limits the use of camera images.

SUMMARY

In one aspect, a safety mirror system for a motor vehicle includes at least one sun visor movably attached to the motor vehicle comprising a safety mirror having a mirror element viewable by a driver or passenger in a folded down or opened position of the sun visor; and at least one camera or monitoring system including a support arm pivotally secured to a base, which is attached to the motor vehicle, a positioning arm secured to the support arm and movable with respect to the support arm and including a camera mount, and at least one camera attached to the camera mount at a distal end of the positioning arm, the camera configured to provide images exterior to the vehicle, where the safety mirror further comprises at least one attachment structure configured to separately and selectively attach the safety mirror to each of the sun visor and the camera mount.

The safety mirror system may further include a substrate provided on one side with a reflective layer for providing a mirror surface and on an opposite side with the attachment structure.

At least one of the substrate and the attachment structure may be each made of a plastic in a two component molding process, and the reflective layer may include a chromium base.

The attachment structure may include a first attachment element complementary to a visor attachment structure of the sun visor and a second attachment element complementary to a mounting structure of the camera mount.

At least one of the first attachment element may be formed together with the second attachment element, and the first attachment element may be identical to the second attachment element.

The attachment structure may include at least one of a first locking element for locking an attachment to the sun visor; and a second locking element for locking an attachment to the camera mount.

A periphery of the safety mirror may have smooth edges with a radius of at least 2.5 mm.

The safety mirror system may further include a second safety mirror, where each of the safety mirror and the second safety mirror includes different specifications corresponding to different country or geographic region requirements.

The safety mirror system may further include a camera motor operatively connected to at least one of the camera or the camera mount to change orientation of the camera with respect to the distal end of the positioning arm.

The safety mirror system may further include a camera gear fixedly secured to at least one of the camera or the camera mount.

The camera motor may include a shaft having a worm gear fixedly secured thereto extending out from the camera motor for providing rotational motion.

The worm gear may engage the camera gear.

The camera may be oriented by the camera motor independently of a position of the support arm.

At least one of the positioning arm may telescope with respect to the support arm; and the support arms may pivot between a retracted and an extended position.

In another aspect, a motor vehicle includes a safety mirror system including at least one sun visor attached to the motor vehicle including a safety mirror having a mirror element viewable by a driver or passenger in a folded down or opened position of the sun visor; and at least one camera or monitoring system including a support arm pivotally secured to the base attached to the motor vehicle, a positioning arm secured to the support arm and movable with respect to the support arm and including a camera mount, and at least one camera attached to the camera mount at a distal end of the positioning arm, the camera configured to provide images exterior to the vehicle, where the safety mirror further includes at least one attachment structure configured to separately and selectively attach the safety mirror to each of the sun visor and the camera mount The safety mirror in a first position, determined by normal operation of the camera or monitoring system, may be attached to the sun visor via a first fastening element so that in the opened or folded-down state of the sun visor it is accessible to a driver or passenger of the motor vehicle, and the safety mirror may be detachable from the sun visor by the driver or passenger.

The safety mirror may be detachable from the sun visor by engagement with one hand in at least one engaging tab of the sun visor or by applying a force of 40 to 100 Newton.

The safety mirror may be configured to be mounted in a second position on the camera mounting via a second fastening element.

The safety mirror may be configured to be connected to the sun visor or the camera mounting via a clip or a latching connection.

At least one of the sun visor may include at least one mounting element for attaching the safety mirror, and the camera mount may include at least one mounting element for mounting the safety mirror.

The sun visor may be arranged in the motor vehicle on a driver's side, and the camera mount may be arranged outside the motor vehicle for attaching the safety mirror on a passenger side.

BRIEF DESCRIPTION OF THE FIGURES

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Figure 1:
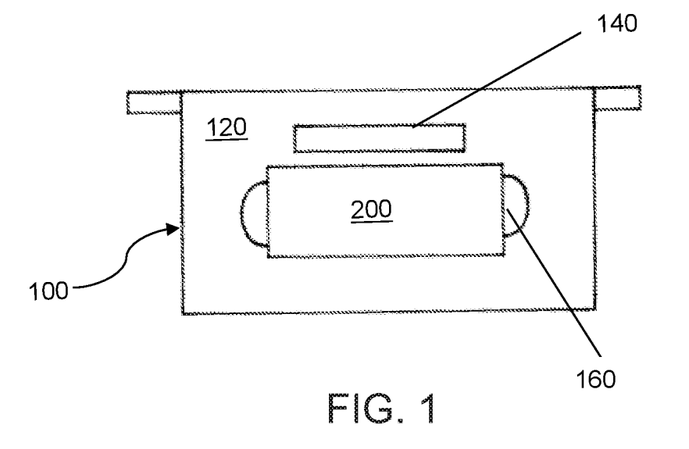
FIG. 1 is a plan view of an example of a folded-down sun visor with a safety mirror.

FIG. 1 shows a folded down sun visor 100 from the perspective of a driver or passenger of a motor vehicle (not shown). The inner surface 120 of the visor 100 is therefore presented to the driver or passenger within a passenger compartment (not shown). On the inner surface 120 of the sun visor 100, a light module 140 and engaging tabs 160 are provided in the region of a safety mirror 200.

Figure 2:
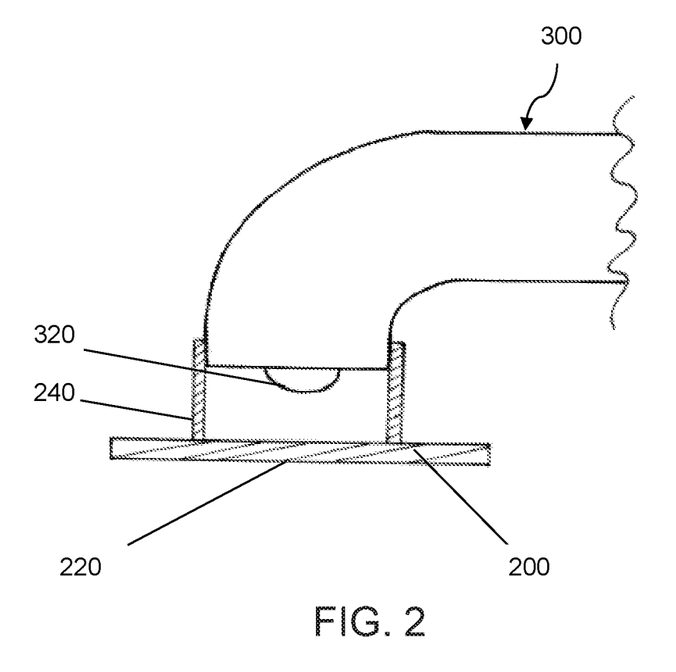
FIG. 2 is a sectional view of an example of the safety mirror of FIG. 1 on a camera mount or rearview assembly.

The safety mirror 200 may optionally be placed on a camera mount 300 outside of the motor vehicle according to FIG. 2. The camera mount 300 may also be referred to more generally as a rearview assembly throughout the application. For this purpose, the safety mirror 200 includes a mirror surface 220, in particular in the form of a chromium-based reflection layer, as described in EP 2 807 284 A1. The reflective layer can be applied to a plastic substrate, which can be formed on its back with fasteners 240, for example, in a 2K injection molding together.

The camera mount 300 carries a video camera (not shown) with a lens 320.

The fastening elements 240 of the safety mirror 200 are shaped such that they allow a secure attachment either to the sun visor 100 or to the camera pawl 300, in particular via a clip connection as known, for example, as described in EP 2 457 770 B1.

The safety mirror 200 thus fulfills a plurality of functions, namely the function of a make-up mirror in the position shown in FIG. 1 and that of a rear-view mirror in the position shown in FIG. 2. To fulfill these functions, the mirror surface 220 is to be dimensioned accordingly.

An inventive motor vehicle can be equipped both on the driver and on the passenger side with a sun visor 100 and a camera mount 300 so that then on each of the two sides a safety mirror 200 is provided for attachment either to the corresponding sun visor 100 or camera mount 300.

Each safety mirror 200, each sun visor 100 and each camera mount 300 may be adapted to the country of delivery of the motor vehicle and the respective statutory provisions.

A change in the position of the safety mirror 200 will be described with reference to FIGS. 1 and 2. In normal operation of a camera/monitor-system, which includes in particular the camera mount 300 together with the lens 320, the safety mirror 200 is attached to the sun visor 100. If there is a defect of the camera/monitor-system, a driver can pull down the visor 100, as shown in FIG. 1, engage with two fingers of his right hand in two engaging tabs 160 left and right of the safety mirror 200 in the sun visor 100 to release the connection between the safety mirror 200 and the sun visor 100 by pulling out the safety mirror 200. In an example, the force to be applied during release can be between 40 and 100 N.

The safety mirror 200 may be released from the sun visor 100 and can then be placed on the camera mount 300 by the driver so that the fasteners 240 engage the camera pawl 300. This position, which is shown in FIG. 2, can be locked by a locking element (not shown) preferably releasably.

Other examples of camera mounts (or rearview assemblies), which may be used with the safety mirror 200 similar to camera mount 300, may include a camera mounted to a telescoping head. These other examples of rearview assemblies will be described below in reference to FIGS. 3-6. Generally, the camera may be positioned at the end of an arm extendable away from a vehicle and pivotable with respect to the vehicle. The term "rearview assembly", as used herein, may mean an assembly attached to the vehicle and which permits the vehicle operator to adequately see rearward and, if present, around any towed vehicle secured to the motor vehicle.

Figure 3:
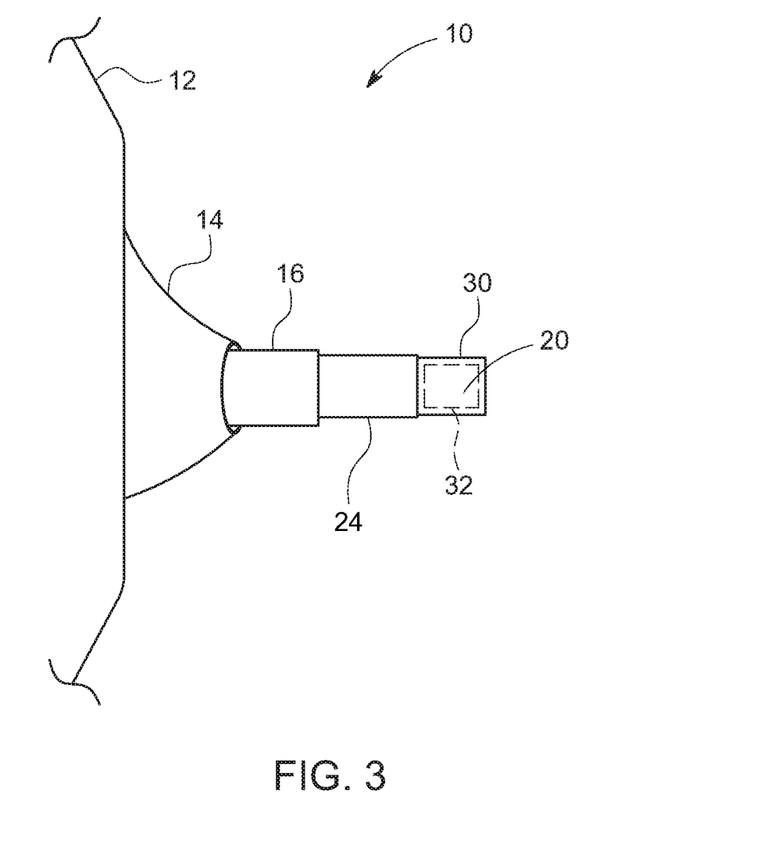
FIG. 3 is a side view of an example of a rearview assembly secured to a vehicle, partially cut away.

Referring now to FIG. 3, an example of a rearview assembly 10 is shown. It should be appreciated that safety mirror 200, described above in reference with FIGS. 1 and 2, may be used with the rearview assembly 10 just as it is used with camera mount 300. As a result, the safety mirror 200 would be mounted to the rearview assembly 10 and have telescoping and pivoting capabilities.

The rearview assembly 10 is configured for installation on a vehicle 12. In certain examples, the rearview assembly 10 is configured for installation on a side door of the vehicle. However, it should be understood that in other embodiments the rearview assembly 10 can be installed on other portions of the vehicle, such as for example the non-limiting examples of the frame, quarter panels or fenders. The rearview assembly 10 is further configured to provide the occupants of the vehicle with a view extending to the rear of the vehicle. In certain embodiments, the rearview assembly 10 can optionally be configured as a break-away design, although it should be understood that the rearview assembly 10 can be practiced without a break-away design.

The rearview assembly 10 includes a base or bracket 14, a support arm 16, and an image generating device 20. In an example, the image generating device 20 is a camera 20 capable of generating an electronic signal of a video feed. The base 12 and support arm 16 are known in the industry and therefore will only be briefly described herein. In an example, a safety mirror 200 as described in reference with FIGS. 1 and 2 may be mounted over the image generating device 20.

Figure 4:
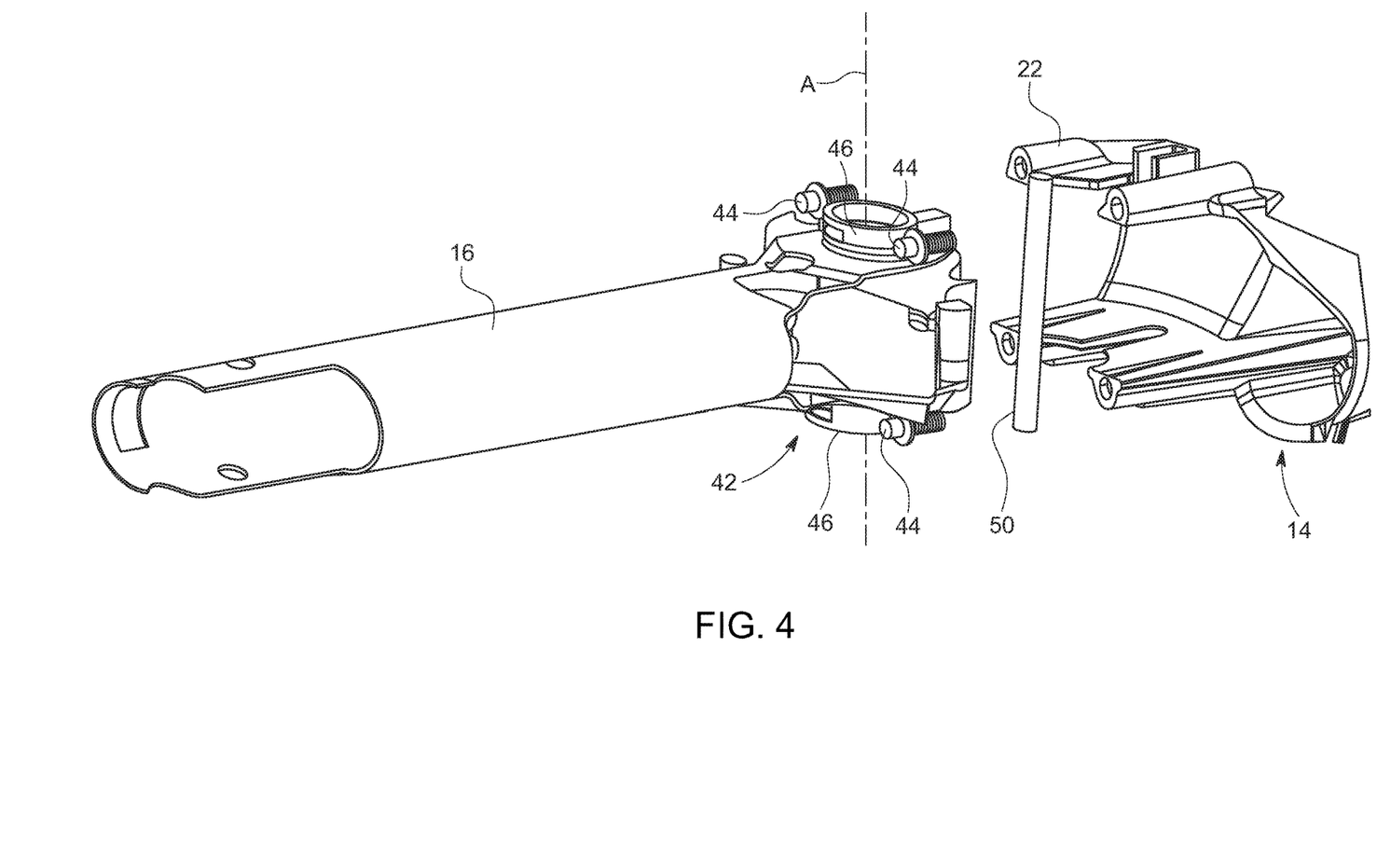
FIG. 4 is an exploded perspective view of an example of the base and support arm of the rearview assembly.

The base 14 is configured to attach the support arm 16 and the camera 20 to the vehicle 12. Referring to FIG. 4, the base 14 includes a base structure 22 and a base cover or scalp (not shown). The base structure 22 is configured to mount the support arm 16 to the vehicle 12. Any desired mechanism, device or structure, sufficient to mount the support arm 16 to the vehicle 12 can be used. Optionally, the base structure 22 can be configured such that the support arm 16 can pivot about a substantially vertical axis A-A. In other examples, the rearview assembly 10 can be configured to pivot about an axis that is not substantially vertical.

The base cover is configured to cover the base structure 22 with an aesthetically pleasing appearance that may or may not match the color and finish of the vehicle. Any desired base cover can be used. The base cover is not shown for purposes of drawing simplification.

The support arm 16 extends from the base 14 and is configured to connect the base 14 with the camera 20. In the illustrated example, the support arm 16 is hollow and has a rectangular cross-sectional shape. However, in other examples, the support arm 16 can have other cross-sectional shapes, such as ovular or circular cross-sectional shapes, sufficient to connect the base 14 with the camera 20. Referring back to FIG. 3, in the illustrated examples, the support arm 16 includes a positioning arm 24. The support arm 16 in the positioning arm 24 have internal mechanisms and devices configured to retract the camera 20 to a retracted position and extend the camera 20 to an extended position. The camera 20 is fixedly secured to a distal end 26 of the positioning arm 24. The positioning arm 24 moves within the support arm 16. Mechanisms and devices for telescoping the camera 20 relative to the base 14 and vehicle 12 are well known in the art and need not be described in detail herein, (see, e.g. U.S. Pat. No. 7,748,857 to Belcher, et al. and assigned to SMR Patents S.à.r.l.). While the example shown in FIG. 4 illustrates a single support arm 16, it should be appreciated that in other examples a quantity of two or more support arms can be used.

As shown in FIG. 3, a housing 30 covers and protects the camera 20. The housing 30 may be of any desired shape and includes various outer walls that merge together in a smooth manner such as to present a pleasing appearance. A substantially rearward facing portion of the housing 30 is open and forms a cavity 32. The cavity 32 is configured to receive the camera 20. A suitable shaped support member (not shown) is secured within the housing 30 and serves to movably support the camera 20 within the cavity 32. Mechanisms used to control the position and orientation of the camera 20 within the housing 30 will be discussed in greater detail subsequently.

In the illustrated example, the camera 20 is of the type to provide real-time digital images. However, in other examples, the camera 20 can provide other types of images. Optionally, the images from the camera 20 can be digitally combined with other images from other cameras to provide the vehicle occupants with a virtual "around-the-vehicle" view. While not shown in the Figures, power and image conducting cables extend from the camera 20. In certain embodiments, the power and image conducting cables can be ducted through the support arm 16 and the positioning arm 24 to controls (not shown) located within the interior of the vehicle.

Referring to the example illustrated in FIG. 4, the support arm 16 has a motor assembly 42 secured therein. The motor assembly 42 is mounted into the base 14 using bolts 44 holding U-shaped attachments straps 46 against projections 48 in the base 14. A detent bar 50 is urged outwardly by springs (not shown) forcing the detent bar 50 away from the base 14. The detent bar 50 provides a stop when the support arm 16 is rotated. The detent bar 50 also provides a load to prevent forward break-away. The motor assembly 42 provides for the pivoting of the support arm 16 between a retracted position and an outward position (the outward position is shown in FIG. 4). When the support arm 16 is in the retracted position, the support arm 16 extends along the vehicle 12 generally parallel thereto. When the support arm 16 is in the outward position, the support arm 16 extends generally perpendicularly to the side of the vehicle 12.

Figure 5A:
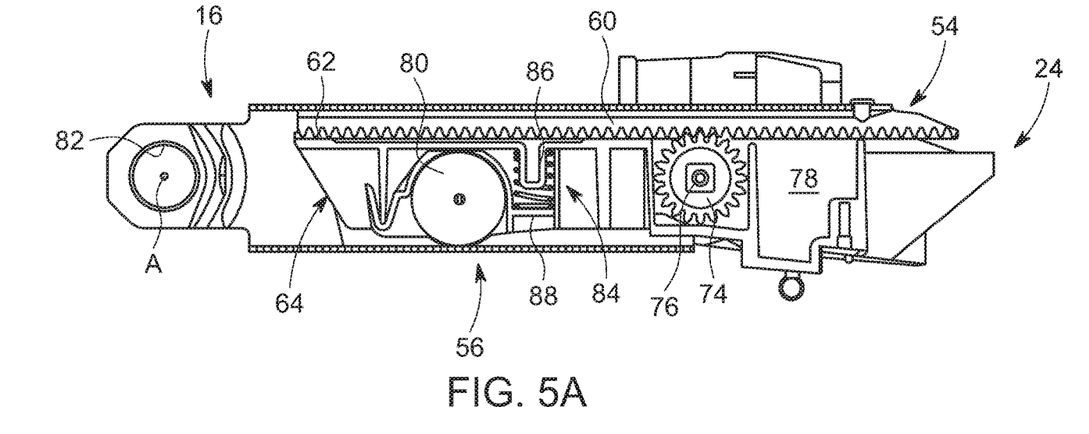
FIG. 5a is a partially cut away top view of the rearview assembly of FIG. 3 with the camera in a retracted position.
Figure 5B:
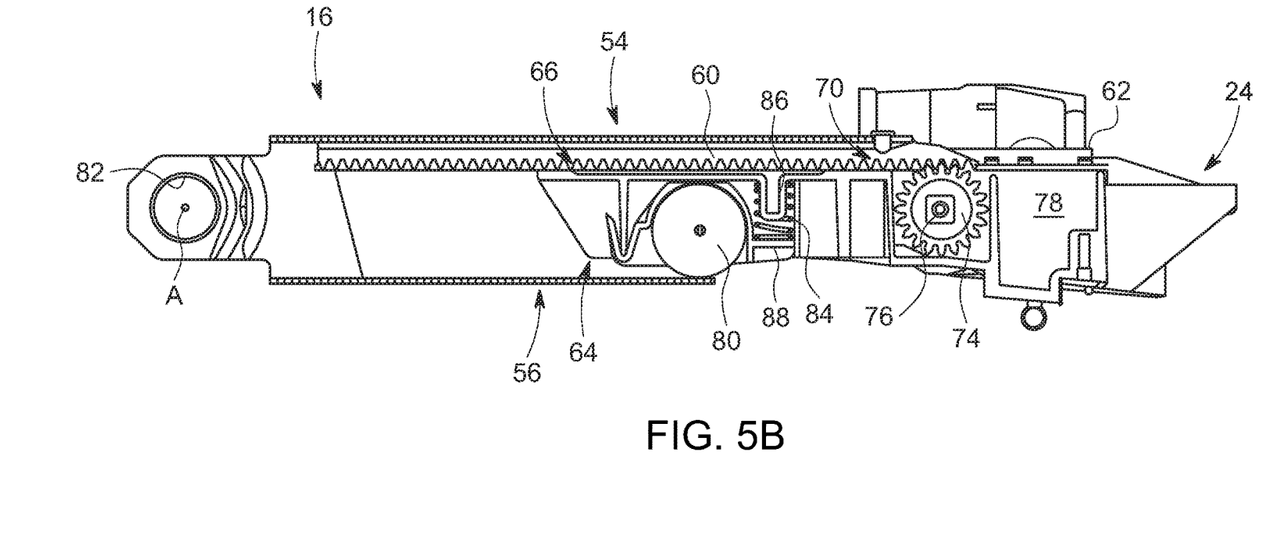
FIG. 5b is a partially cut away top view of the rearview assembly of FIG. 3 with the camera in an extended position.

Referring to FIGS. 5a and 5b, the support arm 16 include a front portion 54 and a rear portion 56. The front portion 54 includes a rack 60. The positioning arm 24 also includes a front portion 62 and a rear portion 64. On the front portion 62 of the positioning arm 24 is an inboard contact surface 66 and an outboard contact surface 70, with the contact surfaces 66, 70 engaging rails (not shown) to guide the positioning arm 24 in a telescoping relationship with the support arm 16.

A pinion 74 is secured to the positioning arm 24 by a pin 76. The pinion 74 is powered by a motor, which is housed within a cavity 78 of the positioning arm 24. The motor drives the pinion 74 in a traditional manner. When the pinion 74 rotates, it engages the rack 60 to translate the rotational motion of the motor in the cavity 78 into lateral motion of the positioning arm 24. A wheel 80 is mounted to the positioning arm 24 and assists in the telescoping movement of the positioning arm 24 with respect to the support arm 16 due to its ability to ride along the rear portion 56 of the support arm 16. A spring 84 extends between a boss 86 and a positioning arm abutment surface 88 to ensure the pinion 74 engages the rack 60.

The support arm 16 includes a folding axis defined by a pivot hole 82. With reference back to FIG. 4, the rearview assembly 10 folds along the axis defined by the pivot hole 82 and telescopes by having the positioning arm 24 relative to the support arm 16 and a coaxial manner.

Figure 6A:
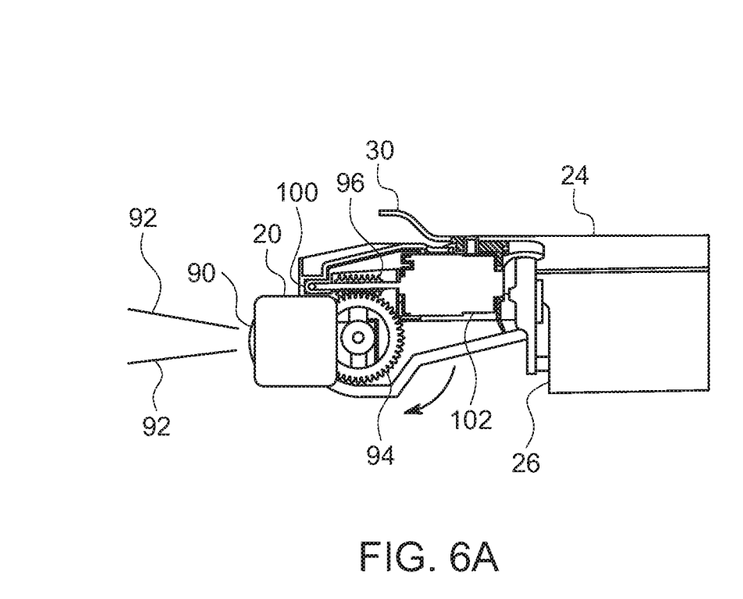
FIGS. 6a and 6b are partially cut away top views of the rearview assembly in unfolded and folded positions, respectively.
Figure 6B:
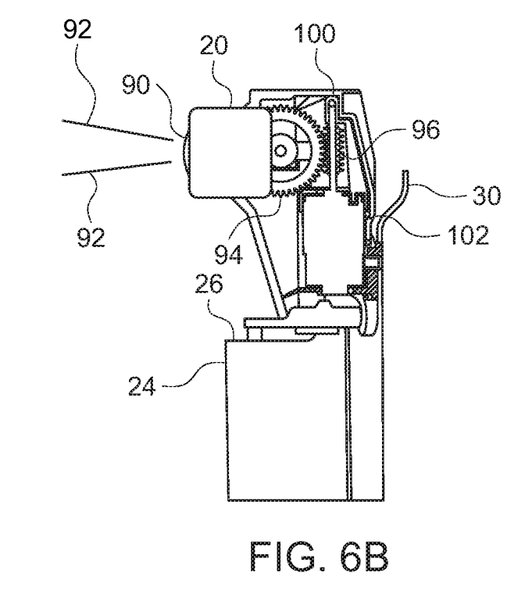

Referring to FIGS. 6a and 6b, the camera 20 is shown at the distal end 26 of the positioning arm 24. For purposes of clarity, the housing 30 for the camera 20 is shown cutaway in these Figures. The camera 20 is shown to include a lens 90. The lens 90 provides a field-of-view, graphically represented by lines 92 in a manner to depict generally a field-of-view, but not representing an actual angle or range of angles through which the field-of-view extends. Although the lens 90 is shown to extend beyond the camera 20, it should be appreciated by those skilled in the art that the lens may be encased within the body of the camera 20. Referring back to FIGS. 1 and 2 simultaneously with FIGS. 6a and 6b, the lens 90 of the camera 20 is similar to the lens 320 of the camera mounting system 300 so that the safety mirror 200 can fit on the lens 90 similarly to how it fits on to the 320 to be part of the rearview assembly 10.

Still referring to FIGS. 6a and 6b, the camera 20 is pivotally secured to the distal end 26 of the positioning arm 24. The camera 20 is pivoted by a camera gear 94, which is driven by a worm gear 96. The worm gear 96 is fixedly secured to a driveshaft 100 that is driven by a camera motor 102. More specifically, the camera motor 102 is secured to the distal end 26 of the positioning arm 24 and is operatively connected to the camera 20. The camera motor 102 changes the orientation of the camera 20 with respect to the distal ends 26 to change the field-of-view 92 of the camera 20 with respect to the vehicle 12.

Referring specifically to FIG. 6a, the camera 20 is oriented by the camera gear 94 such that its field of view 92 extends perpendicular to the positioning arm 24. This is a typical orientation for the camera 20 as the field-of-view 92 in this instance is generally parallel to the side of the vehicle 12 and facing the rearward of the vehicle 12. In such an orientation, the rearview assembly 10 will be able to capture images rearward and to the side of the vehicle 12. In the situation where the positioning arm 24 is fully extended out from the support arm 16, the camera 20 will be able to capture images that are further out from the vehicle 12. This will benefit the driver of the vehicle 12 when the vehicle 12 is towing an object that is longer or wider than what the camera 20 is designed to capture when the positioning arm 24 is retracted into the support arm 16, which is the normal operational position of the rearview assembly 10.

Referring specifically to FIG. 6b, the camera 20 is oriented by the camera gear 94 such that the field-of-view 92 extends parallel to the positioning arm 24 and parallel to the support arm 16. In some embodiments, the field-of-view 92 may even be coaxial with the support arm 16. As with the situation shown in FIG. 6a, the field-of-view 92 is generally parallel to the side of the vehicle 12. Unlike the situation shown in FIG. 6a, the camera 20 is operating even though the support arm 16 and the positioning arm 24 have been moved to the folded position by the motor assembly 42 that prohibits the support arm 16 about an axis defined by the pivot hole 82. The operation of the camera 20 when it is disposed immediately adjacent the vehicle 12 due to the folding of the support arm 16 about the pivot hole 82 is independent of whether the positioning arm 24 is retracted into the support arm 16 or whether the positioning arm 24 is telescoped out away from the support arm 16.

In addition, the orientations of the camera 20 as shown in FIGS. 6a and 6b are the two extreme orientations of the camera 20. The camera 20 may operate in other orientations with respect to the side of the vehicle 12 or the orientation of the positioning arm 24. In other words, the camera 20 may be oriented such that the field-of-view 92 extends out and away from the side of the vehicle 12. This may be done by a driver of the vehicle 12 when towing an extremely wide load. The orientation of the camera 20 may also be modified if the support arm 16 is in a position other than the fully extended position or the fully folded position. It should appreciated that in response to a safety mirror 200 being attached over the lens 90, the safety mirror 200 may also adopt the same orientations and field-of-view as described for the camera 20.

The features of the invention disclosed in the preceding description, the claims and drawings may be essential both individually and in any combination for the realization of the invention in its various embodiments.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. A safety mirror system for a motor vehicle, comprising:
    at least one sun visor movably attached to the motor vehicle comprising a safety mirror having a mirror element viewable by a driver or passenger in a folded down or opened position of the sun visor; and
    at least one camera or monitoring system comprising
        a support arm pivotally secured to a base, which is attached to the motor vehicle,
        a positioning arm secured to the support arm and movable with respect to the support arm and comprising a camera mount; and
        at least one camera attached to the camera mount at a distal end of the positioning arm, the camera configured to provide images exterior to the vehicle,
    wherein the safety mirror further comprises at least one attachment structure configured to separately and selectively attach the safety mirror to each of the sun visor and the camera mount.

2. The safety mirror system according to claim 1, further comprising a substrate provided on one side with a reflective layer for providing a mirror surface and on an opposite side with the attachment structure.

3. The safety mirror system according to claim 2, wherein at least one of
    the substrate and the attachment structure are each made of a plastic in a two component molding process; and
    the reflective layer comprises a chromium base.

4. The safety mirror system according claim 1, wherein the attachment structure comprises a first attachment element complementary to a visor attachment structure of the sun visor and a second attachment element complementary to a mounting structure of the camera mount.

5. The safety mirror system according to claim 4, wherein at least one of
    the first attachment element is formed together with the second attachment element; and
    the first attachment element is identical to the second attachment element.

6. The safety mirror system according to claim 1, wherein the attachment structure comprises at least one of:
    a first locking element for locking an attachment to the sun visor; and
    a second locking element for locking an attachment to the camera mount.

7. The safety mirror system according to claim 1, wherein a periphery of the safety mirror has smooth edges with a radius of at least 2.5 mm.

8. The safety mirror system according to claim 1, further comprising a second safety mirror, wherein each of the safety mirror and the second safety mirror comprises different specifications corresponding to different country or geographic region requirements.

9. The safety mirror system according to claim 1, further comprising a camera motor operatively connected to at least one of the camera or the camera mount to change orientation of the camera with respect to the distal end of the positioning arm.

10. The safety mirror system according to claim 9, further comprising a camera gear fixedly secured to at least one of the camera or the camera mount.

11. The safety mirror system according to claim 10, wherein the camera motor includes a shaft having a worm gear fixedly secured thereto extending out from the camera motor for providing rotational motion.

12. The safety mirror system according to claim 11, wherein the worm gear engages the camera gear.

13. The safety mirror system according to claim 12, wherein the camera is oriented by the camera motor independently of a position of the support arm.

14. The safety mirror system according to claim 1, wherein at least one of
    the positioning arm telescopes with respect to the support arm; and
    the support arms pivots between a retracted and an extended position.

15. A motor vehicle, comprising a safety mirror system comprising:
    at least one sun visor attached to the motor vehicle comprising a safety mirror having a mirror element viewable by a driver or passenger in a folded down or opened position of the sun visor; and
    at least one camera or monitoring system comprising
        a support arm pivotally secured to the base attached to the motor vehicle
        a positioning arm secured to the support arm and movable with respect to the support arm and comprising a camera mount; and at least one camera attached to the camera mount at a distal end of the positioning arm, the camera configured to provide images exterior to the vehicle, wherein the safety mirror further comprises at least one attachment structure configured to separately and selectively attach the safety mirror to each of the sun visor and the camera mount.

16. The motor vehicle according to claim 15, wherein the safety mirror in a first position, determined by normal operation of the camera or monitoring system, is attached to the sun visor via a first fastening element so that in the opened or folded-down state of the sun visor it is accessible to a driver or passenger of the motor vehicle, and the safety mirror is detachable from the sun visor by the driver or passenger.

17. The motor vehicle according to claim 16, wherein the safety mirror is detachable from the sun visor by engagement with one hand in at least one engaging tab of the sun visor or by applying a force of 40 to 100 Newton.

18. The motor vehicle according to claim 16, wherein the safety mirror is configured to be mounted in a second position on the camera mounting via a second fastening element.

19. The motor vehicle according to claim 15, wherein the safety mirror is configured to be connected to the sun visor or the camera mounting via a clip or a latching connection.

20. The motor vehicle according to claim 15, wherein at least one of
    the sun visor comprises at least one mounting element for attaching the safety mirror; and
    the camera mount comprises at least one mounting element for mounting the safety mirror.

21. The motor vehicle according to claim 15, wherein the sun visor is arranged in the motor vehicle on a driver's side, and the camera mount is arranged outside the motor vehicle for attaching the safety mirror on a passenger side.

\* \* \* \* \*